United States Patent
Roberge

(10) Patent No.: US 11,530,616 B2
(45) Date of Patent: Dec. 20, 2022

(54) FINGER SEAL ASSEMBLY FOR GAS TURBINE ENGINE AND METHOD OF MAKING

(71) Applicant: Raytheon Technologies Corporation, Farmington, CT (US)

(72) Inventor: Gary D. Roberge, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 6 days.

(21) Appl. No.: 17/022,650

(22) Filed: Sep. 16, 2020

(65) Prior Publication Data

US 2022/0082026 A1 Mar. 17, 2022

(51) Int. Cl.
*F01D 11/00* (2006.01)
*F16J 15/02* (2006.01)
*F16J 15/08* (2006.01)

(52) U.S. Cl.
CPC ........... *F01D 11/005* (2013.01); *F16J 15/022* (2013.01); *F16J 15/0887* (2013.01);
(Continued)

(58) Field of Classification Search
CPC .... F16J 15/00; F16J 15/02; F16J 15/46; F16J 15/48; F16J 15/021; F16J 15/08; F16J 15/022; F16J 15/024; F16J 15/025; F16J 15/027; F16J 15/0887; F16J 15/0893; F01D 11/00; F01D 11/005; F05D 2220/00; F05D 2220/323; F05D 2220/32; F05D 2220/321; F05D 2220/3212; F05D 2220/3213; F05D 2220/3215–3219; F05D 2230/60; F05D 2230/61; F05D 2230/64; F05D 2230/642;
(Continued)

(56) References Cited

U.S. PATENT DOCUMENTS

| | | | | |
|---|---|---|---|---|
| 4,645,217 A | * | 2/1987 | Honeycutt, Jr | F01D 11/005 277/555 |
| 5,897,120 A | * | 4/1999 | Scavo | F16J 15/122 277/628 |

(Continued)

OTHER PUBLICATIONS

European Search Report for European Application No. 21186255.2 dated Dec. 3, 2021.

*Primary Examiner* — Nathan Cumar
(74) *Attorney, Agent, or Firm* — Cantor Colburn LLP

(57) ABSTRACT

A seal assembly for a gas turbine engine, including: a first finger seal assembly, the first finger seal assembly including two layers each being secured to each other, the two layers each having a plurality of slots that are offset from each other when the two layers of the first finger seal assembly are secured to each other; a second finger seal assembly, the second finger seal assembly including two layers each secured to each other, the two layers each having a plurality of slots that are offset from each other when the two layers of the second finger seal assembly are secured to each other; and an arc-shaped segment finger seal assembly located between the first finger seal assembly and the second finger seal assembly, the arc-shaped finger seal assembly including two layers each secured to each other, the two layers each having a plurality of slots that are offset from each other when the two layers of the arc-shaped finger seal assembly are secured to each other.

20 Claims, 9 Drawing Sheets

(52) U.S. Cl.
CPC .... *F05D 2220/323* (2013.01); *F05D 2230/60* (2013.01); *F05D 2240/57* (2013.01); *F05D 2250/71* (2013.01); *F05D 2300/175* (2013.01)

(58) Field of Classification Search
CPC ........... F05D 2230/644; F05D 2240/57; F05D 2250/71; F05D 2250/711; F05D 2250/712; F05D 2250/713; F05D 2300/175
USPC ........................................................ 277/650
See application file for complete search history.

(56) References Cited

U.S. PATENT DOCUMENTS

| | | | |
|---|---|---|---|
| 10,138,742 B2 * | 11/2018 | Budnick | F02C 7/28 |
| 2009/0087307 A1 * | 4/2009 | Takeuchi | F01D 11/04 |
| | | | 415/174.2 |
| 2015/0354386 A1 | 12/2015 | Chuong et al. | |
| 2018/0030844 A1 * | 2/2018 | White | F16J 15/0887 |

* cited by examiner

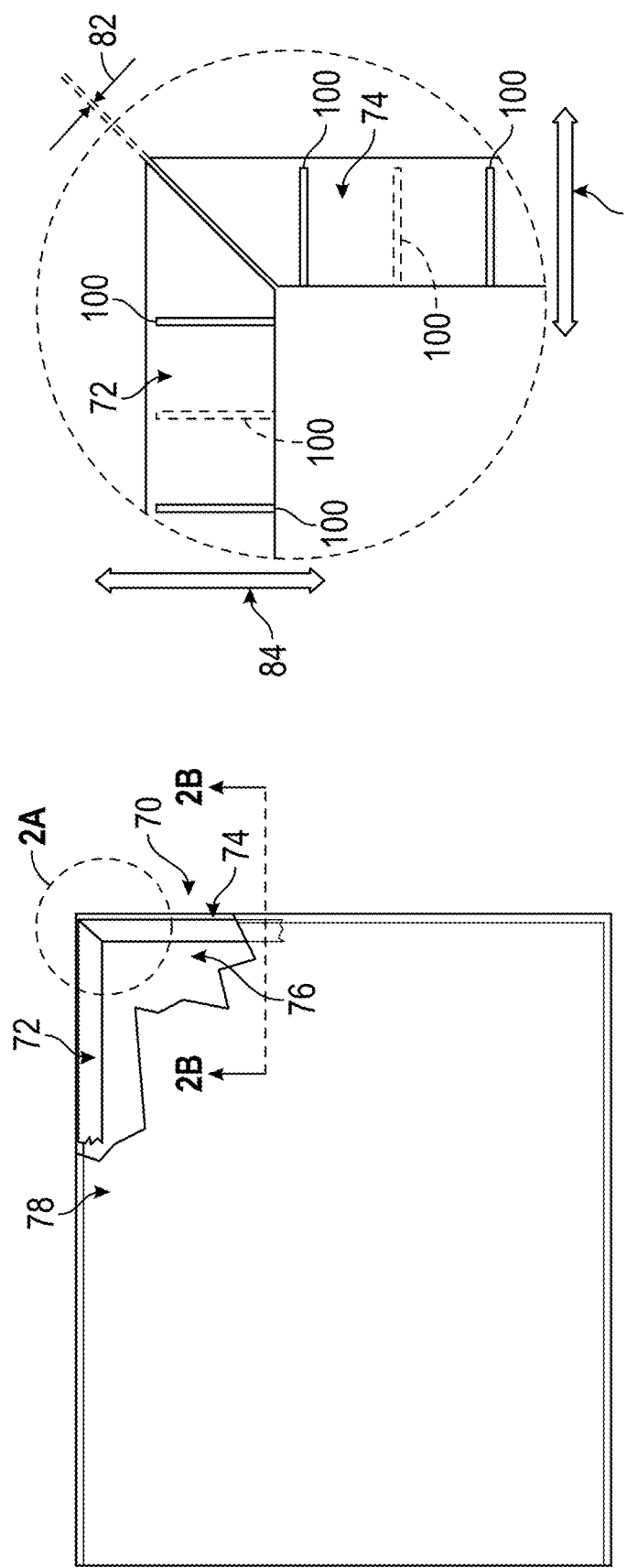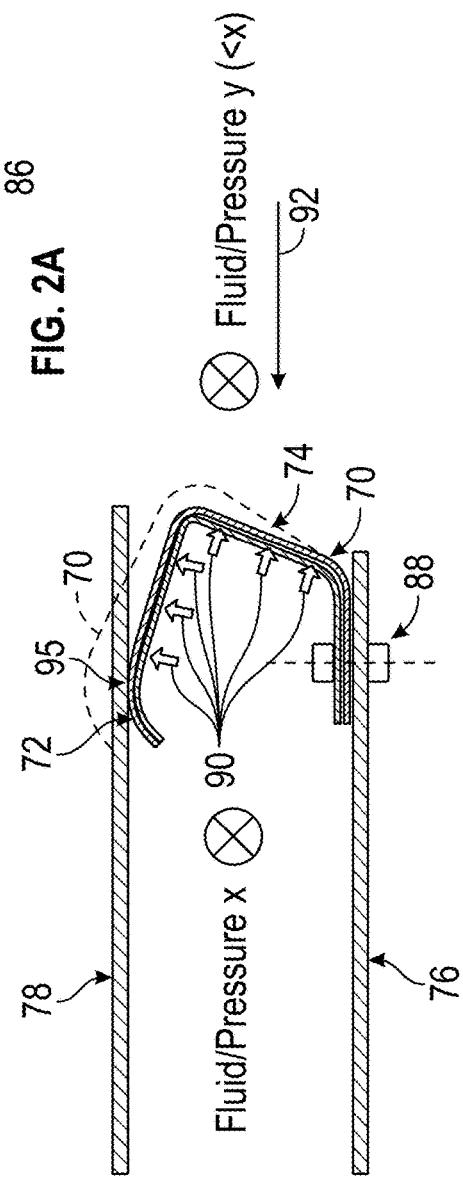

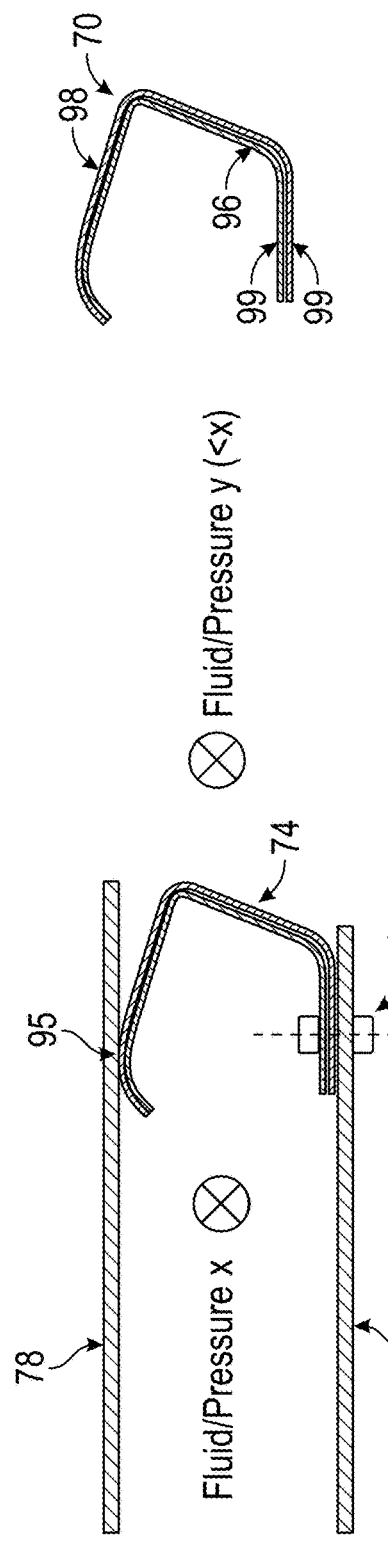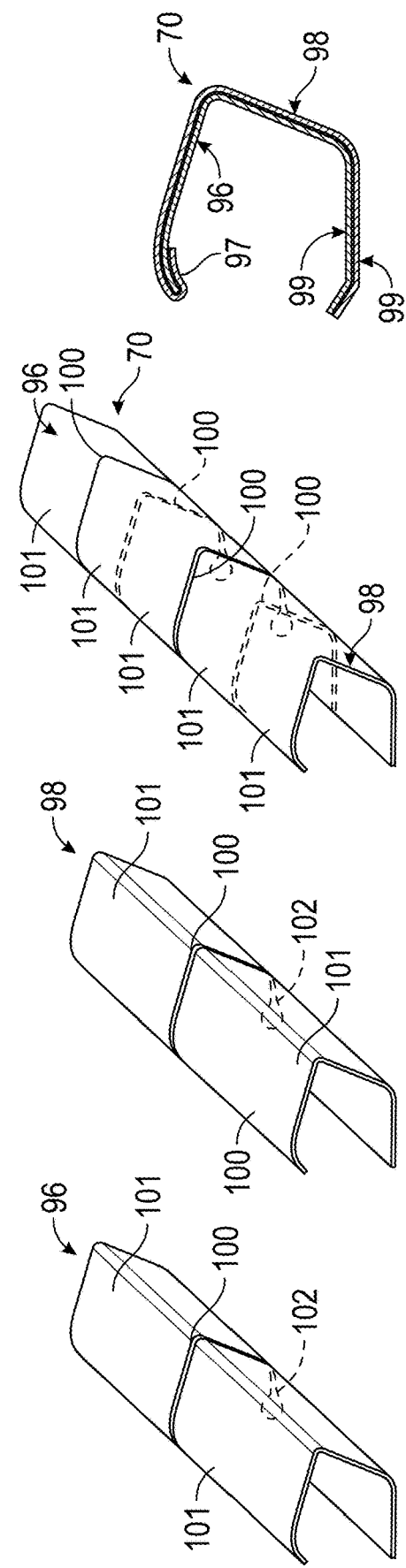

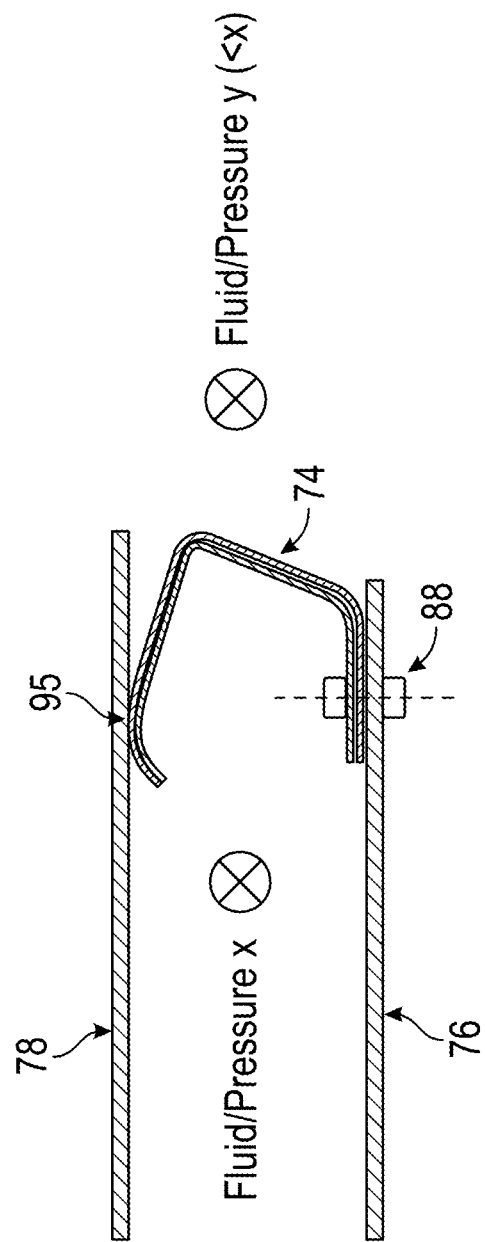

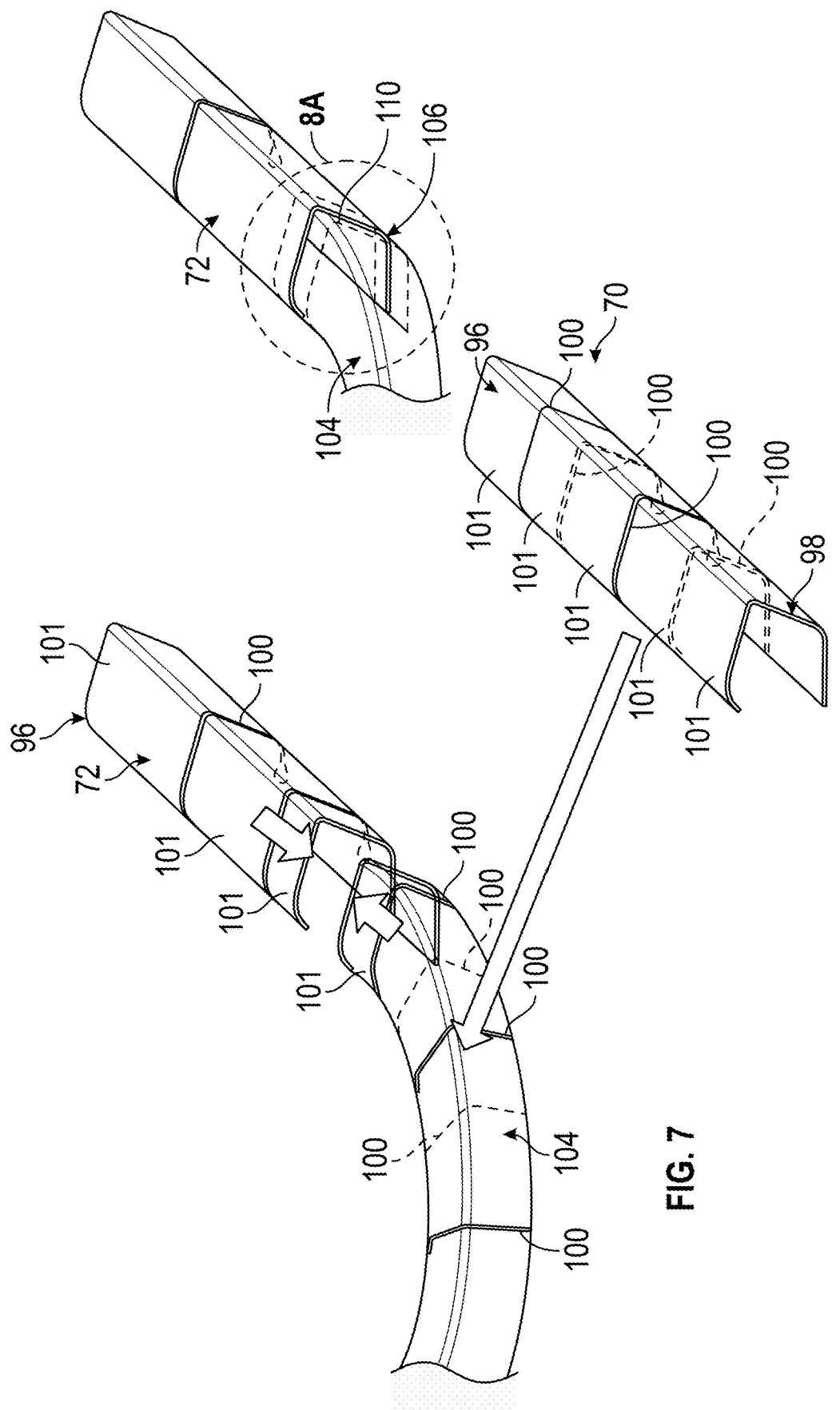

FINGER SEAL ASSEMBLY FOR GAS TURBINE ENGINE AND METHOD OF MAKING

STATEMENT OF FEDERAL SUPPORT

This invention was made with Government support awarded by the United States. The Government has certain rights in this invention.

BACKGROUND

This disclosure relates to a gas turbine engine, and more particularly to an airfoil that may be incorporated into a gas turbine engine.

Finger seal assemblies are used to seal or isolate flows between two or more component which may be static or dynamic relative to each other including but not limited to one being static and one being dynamic. Finger seal assemblies typically consist of two or more layers of thin sheet metal that are nested to form an assembly. While finger seals typically provide effective leakage, issues can arise at the intersection of individual seals. When this occurs, undesired leakage can increase significantly. Accordingly, alternate seal designs are desired to reduce this leakage under operating conditions.

BRIEF DESCRIPTION

Disclosed is a seal assembly for a gas turbine engine, including: a first finger seal assembly, the first finger seal assembly including two layers each being secured to each other, the two layers each having a plurality of slots that are offset from each other when the two layers of the first finger seal assembly are secured to each other; a second finger seal assembly, the second finger seal assembly including two layers each secured to each other, the two layers each having a plurality of slots that are offset from each other when the two layers of the second finger seal assembly are secured to each other; and an arc-shaped segment finger seal assembly located between the first finger seal assembly and the second finger seal assembly, the arc-shaped finger seal assembly including two layers each secured to each other, the two layers each having a plurality of slots that are offset from each other when the two layers of the arc-shaped finger seal assembly are secured to each other.

In addition to one or more of the features described above, or as an alternative to any of the foregoing embodiments, the first finger seal assembly and the second finger seal assembly are welded to the arc-shaped segment finger seal assembly.

In addition to one or more of the features described above, or as an alternative to any of the foregoing embodiments, the first finger seal assembly and the second finger seal assembly have a linear configuration.

In addition to one or more of the features described above, or as an alternative to any of the foregoing embodiments, the seal assembly includes a first joining strip that overlaps a seam where the first finger seal assembly is secured to the arc-shaped segment finger seal assembly and a second joining strip that overlaps a seam where the second finger seal assembly is secured to the arc-shaped segment finger seal assembly.

In addition to one or more of the features described above, or as an alternative to any of the foregoing embodiments, the first joining strip and the second joining strip are formed of the same material as the first finger seal assembly, the arc-shaped segment finger seal assembly and the second finger seal assembly.

In addition to one or more of the features described above, or as an alternative to any of the foregoing embodiments, the seal assembly includes a first pair of joining strips that overlap opposite sides of a seam where the first finger seal assembly is secured to the arc-shaped segment finger seal assembly and a second pair of joining strips that overlap opposite sides of a seam where the second finger seal assembly is secured to the arc-shaped segment finger seal assembly.

In addition to one or more of the features described above, or as an alternative to any of the foregoing embodiments, the first pair of joining strips and the second pair of joining strips are formed of the same material as the first finger seal assembly, the arc-shaped segment finger seal assembly and the second finger seal assembly.

In addition to one or more of the features described above, or as an alternative to any of the foregoing embodiments, the first finger seal assembly, the arc-shaped segment finger seal assembly and the second finger seal assembly are formed from the same material.

In addition to one or more of the features described above, or as an alternative to any of the foregoing embodiments, wherein the first finger seal assembly, the arc-shaped segment finger seal assembly and the second finger seal assembly are formed from a corrosion-resistant nickel chromium material.

In addition to one or more of the features described above, or as an alternative to any of the foregoing embodiments, the plurality of slots extend from a keyhole geometry.

Also disclosed is an assembly of a gas turbine engine, the assembly including: a first component; a second component; a seal assembly located between the first component and the second component, the seal assembly including: a first finger seal assembly, the first finger seal assembly including two layers secured to each other, the two layers each having a plurality of slots that are offset from each other when the two layers of the first finger seal assembly are secured to each other; a second finger seal assembly, the second finger seal assembly including two layers secured to each other, the two layers each having a plurality of slots that are offset from each other when the two layers of the second finger seal assembly are secured to each other; and an arc-shaped segment finger seal assembly located between the first finger seal assembly and the second finger seal assembly, the arc-shaped finger seal assembly including two layers secured to each other, the two layers each having a plurality of slots that are offset from each other when the two layers of the arc-shaped finger seal assembly are secured to each other.

In addition to one or more of the features described above, or as an alternative to any of the foregoing embodiments, the first finger seal assembly and the second finger seal assembly are welded to the arc-shaped segment finger seal assembly.

In addition to one or more of the features described above, or as an alternative to any of the foregoing embodiments, the first finger seal assembly and the second finger seal assembly have a linear configuration.

In addition to one or more of the features described above, or as an alternative to any of the foregoing embodiments, the assembly includes a first joining strip that overlaps a seam where the first finger seal assembly is secured to the arc-shaped segment finger seal assembly and a second joining strip that overlaps a seam where the second finger seal assembly is secured to the arc-shaped segment finger seal assembly.

In addition to one or more of the features described above, or as an alternative to any of the foregoing embodiments, the first joining strip and the second joining strip are formed of the same material as the first finger seal assembly, the arc-shaped segment finger seal assembly and the second finger seal assembly.

In addition to one or more of the features described above, or as an alternative to any of the foregoing embodiments, the assembly includes a first pair of joining strips that overlap opposite sides of a seam where the first finger seal assembly is secured to the arc-shaped segment finger seal assembly and a second pair of joining strips that overlap opposite sides of a seam where the second finger seal assembly is secured to the arc-shaped segment finger seal assembly.

In addition to one or more of the features described above, or as an alternative to any of the foregoing embodiments, the first pair of joining strips and the second pair of joining strips are formed of the same material as the first finger seal assembly, the arc-shaped segment finger seal assembly and the second finger seal assembly.

In addition to one or more of the features described above, or as an alternative to any of the foregoing embodiments, the first finger seal assembly, the arc-shaped segment finger seal assembly and the second finger seal assembly are formed from the same material.

Also disclosed is a method of forming a seal assembly for a gas turbine engine, the method including the steps of: forming a first finger seal assembly by securing two layers to each other, the two layers each having a plurality of slots that are offset from each other when the two layers of the first finger seal assembly are secured to each other; forming a second finger seal assembly by securing two layers to each other, the two layers each having a plurality of slots that are offset from each other when the two layers of the second finger seal assembly are secured to each other; and securing an arc-shaped segment finger seal assembly between the first finger seal assembly and the second finger seal assembly, the arc-shaped finger seal assembly including two layers secured to each other, the two layers each having a plurality of slots that are offset from each other when the two layers of the arc-shaped finger seal assembly are secured to each other.

In addition to one or more of the features described above, or as an alternative to any of the foregoing embodiments, the method includes the step of welding the first finger seal assembly and the second finger seal assembly are to the arc-shaped segment finger seal assembly.

BRIEF DESCRIPTION OF THE DRAWINGS

The following descriptions should not be considered limiting in any way. With reference to the accompanying drawings, like elements are numbered alike:

FIG. 2 is a view of a seal or finger seal assembly;

FIG. 2A is an enlarged view of the seal or finger seal assembly illustrated in FIG. 2;

FIG. 2B is a cross-sectional view of a portion of the seal or finger seal assembly illustrated in FIG. 2;

FIGS. 3 and 3A are cross sections view of a finger seal assembly;

FIGS. 3B and 3C illustrate portions of a finger seal assembly;

FIG. 3D is a perspective view of a portion of a finger seal assembly;

FIG. 3E is an end view of a portion of a finger seal assembly in accordance with an alternative embodiment of the present disclosure;

FIG. 4B is a cross-sectional view of a portion of the seal or finger seal assembly illustrated in FIG. 4;

FIGS. 7, 8 and 8A, illustrate the assembly and interface of linear finger seal sections with arc sections at tangency joint lines of a seal or finger seal assembly in accordance with an embodiment of the present disclosure.

DETAILED DESCRIPTION

A detailed description of one or more embodiments of the disclosed apparatus and method are presented herein by way of exemplification and not limitation with reference to the FIGS.

Figure 1:
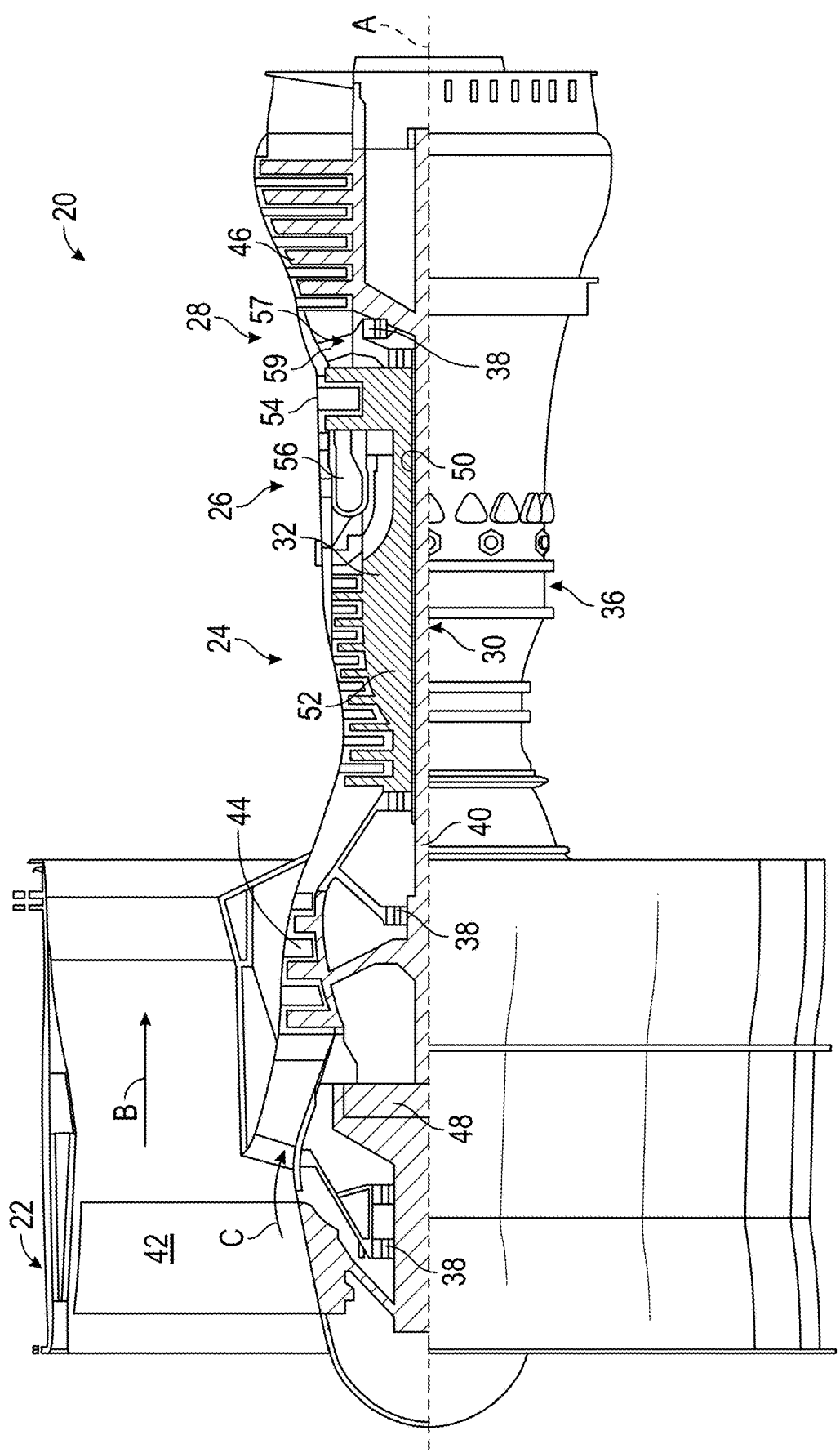
FIG. 1 is a schematic, partial cross-sectional view of a gas turbine engine contemplated for use with the present disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first or low pressure compressor 44 and a first or low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second or high pressure compressor 52 and a second or high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 1A:
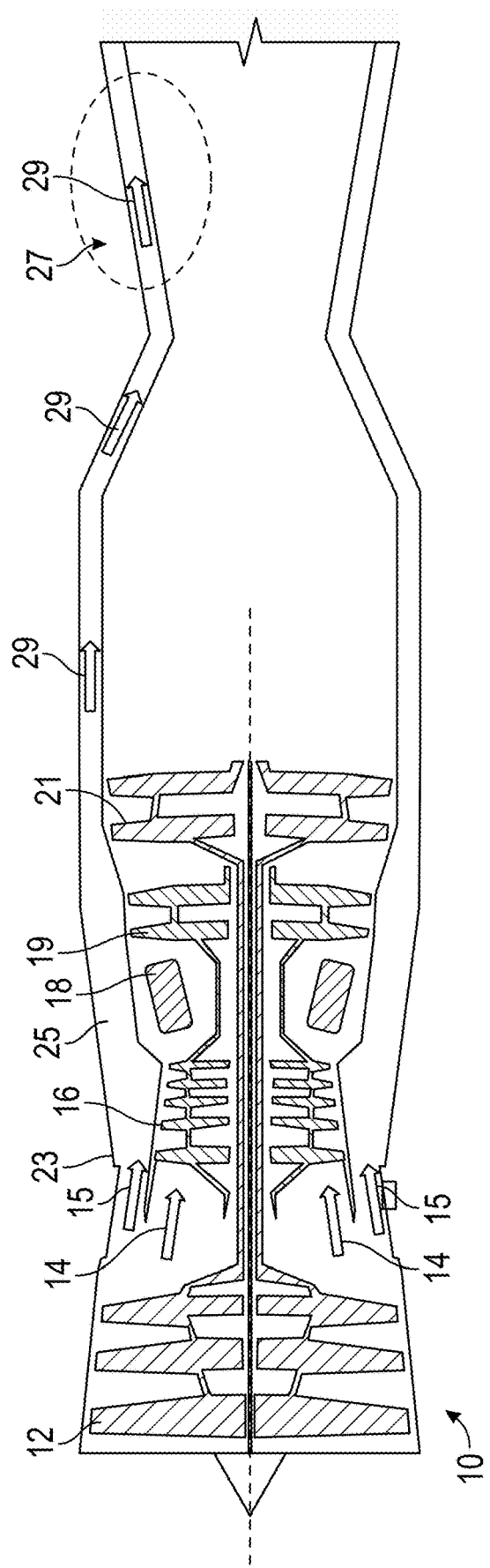
FIG. 1A is a schematic illustration of another exemplary gas turbine engine contemplated for use with the present disclosure.

FIG. 1A is a schematic illustration of another exemplary gas turbine engine 10 capable of using features of the present disclosure. While various engines are illustrated in FIGS. 1 and 1A, it is to be appreciated that the present disclosure may be utilized with other gas turbine engine configurations such as, but not limited to, turbo prop, turbo fan (geared or conventional), or industrial gas turbine engines. The gas turbine engine 10 generally has a fan 12 through which ambient air is propelled in the direction of arrows 14 and 15. Arrows 14 illustrate fan discharge flow to a core of the engine while arrow 15 illustrate fan discharge/bypass flow. A high pressure compressor 16 for pressurizing the air received from the fan 12 is also illustrated as well as a combustor 18 wherein the compressed air is mixed with fuel and ignited for generating combustion gases.

The gas turbine engine 10 further comprises a high pressure turbine 19 as well as a low pressure turbine 21 located in a turbine section of engine 10 for extracting energy from the combustion gases. The low pressure turbine 21 is operatively coupled to a low pressure compressor as is known in the related arts. Fuel is injected into the combustor 18 of the gas turbine engine 10 for mixing with the compressed air from the compressors (low and high) and ignition of the resultant mixture. The fan 12, the compressors (low and high), combustor 18, and turbines high and low 19, 21 are typically located with an engine casing 23 all concentric about a common central longitudinal axis of the gas turbine engine 10.

As mentioned above, the gas turbine engine 10 may further comprise a low pressure compressor located in front of a high pressure compressor 16 and a high pressure turbine 19 located in front of a low pressure turbine 21. For example, the compressor section may be a multi-stage compressor section that has a low-pressure compressor and a high-pressure compressor 16 and the turbine section may be a multistage turbine section that has a high-pressure turbine 19 and a low-pressure turbine 21. In one embodiment, the low-pressure compressor is connected to the low-pressure turbine and the high pressure compressor is connected to the high-pressure turbine.

Also illustrated, is a fan duct 25 that directs the fan discharge/bypass flow to an exhaust nozzle 27 (depicted by the dashed lines) in the direction of arrows 29. While only one portion of the exhaust nozzle 27 and the fan duct 25 is illustrated it is understood that in one embodiment, the exhaust nozzle 27 and the fan duct 25 are circumferentially arranged about an axis of the engine 10.

FIGS. 2, 2A and 2B illustrate a seal assembly or finger seal assembly 70. In one embodiment, the seal assembly or finger seal assembly 70 may be associated with a nacelle/thrust reverser of the gas turbine engine. Alternatively, the seal assembly or finger seal assembly 70 may be associated an exhaust nozzle 27 (See FIG. 1A) of the gas turbine engine. Of course, may other locations as well as numerous applications within a single engine are contemplated for use with present disclosure. The seal assembly or finger seal assembly 70 includes at least a first finger seal assembly 72 that is secured to a second finger seal assembly 74. In one non-limiting embodiment, the first finger seal assembly 72 and the second finger seal assembly 74 each have a linear configuration. The first finger seal assembly 72 and second finger seal assembly are secured to each other and are used to seal or isolate flows between two or more static, dynamic or combinations thereof components 76 and 78 as depicted in FIGS. 2 and 2B. In one non-limiting embodiment, the components 76 and 78 may be an exhaust part structure (e.g., exhaust nozzle 27) and a liner that is cooled by a source of cooling air (e.g., fan bypass flow, etc.). For example and in one non-limiting embodiment, the exhaust part structure and associated liner may be a portion of the exhaust nozzle 27 of the gas turbine engine 10 illustrated in at least FIG. 1A. In FIG. 2 a portion of component 78 is removed for clarity.

The first finger seal assembly 72 and second finger seal assembly are secured to each other at an interface 80, which as illustrated may be a mitered seal interface. In some applications this interface 80 is located at a corner of the components 76 and 78. As used herein corner may be referred to a 90 degree section or change or any other section where two sides of the components 76 and 78 transition from one direction to another that is not substantially linear (e.g., a curve, corner or any other change).

As depicted in FIG. 2A, this interface 80 may involve a mitered or beveled arrangement between the individual seal assemblies 72 and 74. The interface between the individual seal assemblies 72 and 74 is accompanied by a gap or leakage source 82 created by individual geometric tolerances between individual seal assemblies 72 and 74 and associated assembly variation. This gap can become more pronounced in actual operation due to relative displacement between the individual seal assemblies 72 and 74 which may be associated with thermal and/or pressure induced deflection. This thermal and/or pressure induced deflection is illustrated by arrows 84 and 86. For example, arrows 84 illustrate the movement of first seal assembly 72 and arrows the 86 illustrate the movement of second seal assembly 74. When this occurs, undesired leakage can increase significantly.

In FIG. 2B, securement and movement of the second seal assembly 74 between components 76 and 78 is illustrated. For example and in one non-limiting embodiment, the second seal assembly 74 is secured to component 76 or 78 by a rivet 88 or other suitable means of securement.

Fluid/Pressure Px is applied to the second seal assembly 74 of the seal assembly 70 in the direction of arrows 90 while Fluid/Pressure Py is applied to the second seal assembly 74 of the seal assembly 70 in the direction of arrows 92. The dashed lines 94 illustrate the uninstalled or free state of the second seal assembly 74 while the solid lines in FIG. 2B illustrate the installed state of the second seal assembly 74. In accordance with one application of the present disclosure Pressure Px is greater than pressure Py. As such, the second seal assembly 74 will have a differential pressure induced loading bias in the directions of arrows 90. As shown in FIG. 2B, the second finger seal assembly 74 is designed to deform at assembly to form a seal between flows with different pressures and the difference in pressure is a design attribute intended to promote contact and sealing. As such, a spring loaded seal interface 95 with component 78 or alternatively component 76 and the second finger seal assembly 74 is provided.

As illustrated in FIGS. 3, 3A, 3B, 3C, 3D and 3E, a finger seal assembly (e.g., first seal assembly 72 or second seal assembly 74) typically consists of two or more layers of thin sheet metal such as a first seal assembly layer 96 and a second seal assembly layer 98 that are nested to form a portion of the seal assembly 70. In one embodiment, the first seal assembly layer 96 and a second seal assembly layer 98 are secured to each other by a resistance spot weld or seam welds 99. In one alternative embodiment an end 97 of second layer 98 at a free end of the seal (e.g., away from the end that is attached via the riveted attachment) can extend beyond the end of layer 96 and wrap around first layer 96 in order to help in positioning the second layer 98 with respect to the first layer 96. This is illustrated in FIG. 3E. Each layer (e.g., first seal assembly layer 96 and a second seal assembly layer 98) has thin slots or a plurality of slots 100 that extend from an end of the assembly layer and terminates in a keyhole geometry 102. The keyhole geometry 102 provides a means of preventing sheet cracking at the termination of each slot 100. The slots 100 create a plurality of fingers 101 in each layer 96, 98 of the seal assemblies. Thus, each layer 96, 98 of the seal assemblies will have a plurality of fingers 101 formed between the slots 100 such that a finger seal assembly is created when the layers 96, 98 are secured to each other.

When the first seal assembly layer 96 and a second seal assembly layer 98 are nested to form a portion of the seal assembly 70 the slot 100 locations between the layers are offset to allow for flexure of each sealing "finger" with minimal leakage between layers. While finger seals typically provide effective leakage, issues can arise at the intersection of individual seals such as the gap 82 as illustrated in FIG. 2A.

Figure 4A:
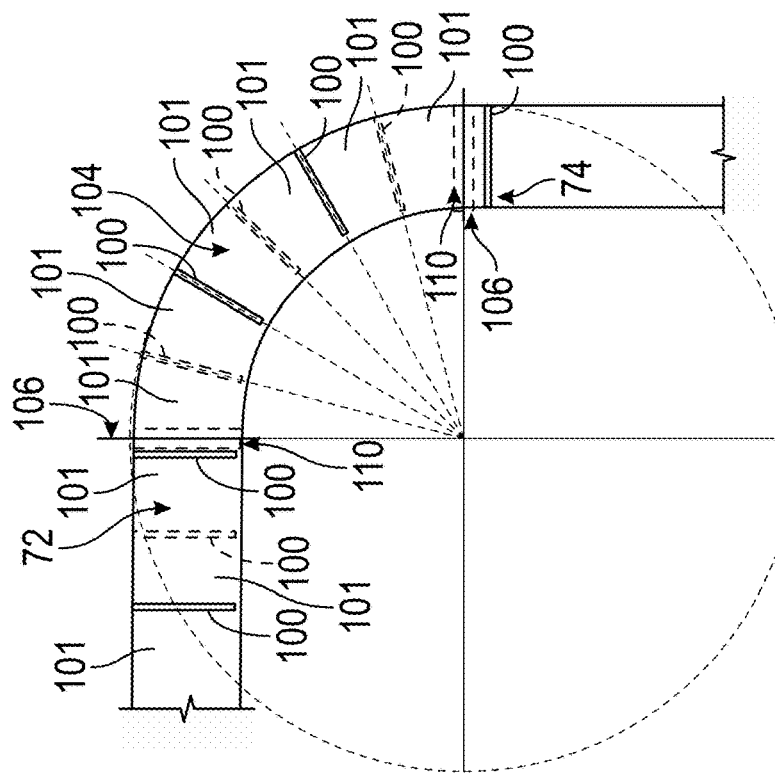
FIG. 4A is an enlarged view of the seal or finger seal assembly illustrated in FIG. 4.
Figure 4:
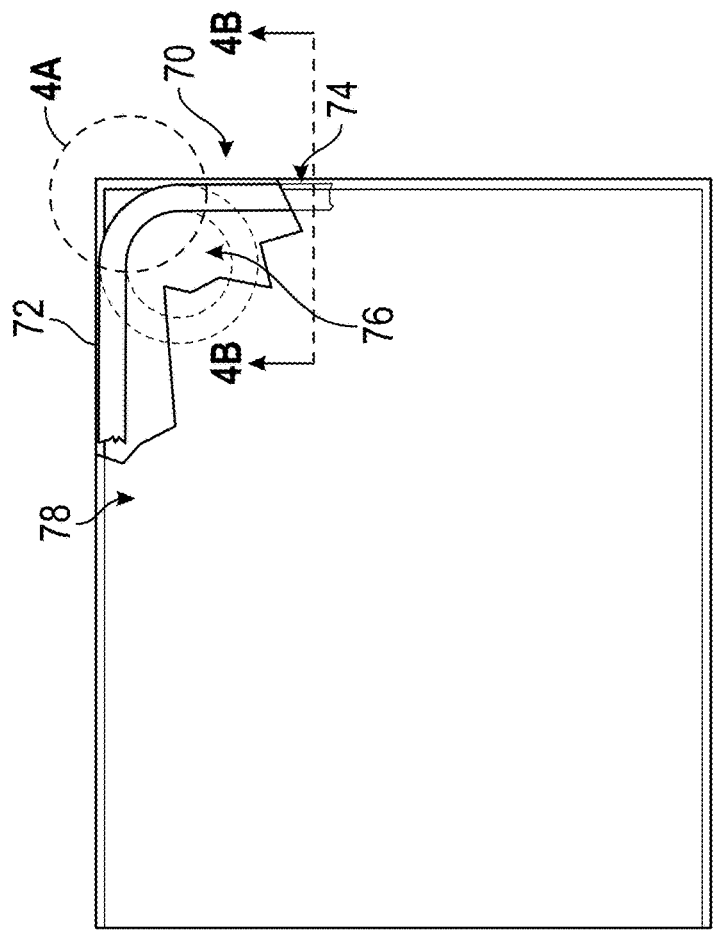
FIG. 4 is a view of a seal or finger seal assembly in accordance with an embodiment of the present disclosure.

Referring now to FIGS. 4, 4A and 4B a finger seal design in accordance with one embodiment of the present disclosure is illustrated. The illustrated design uses an arc-shaped segment or arc-shaped finger seal assembly 104 of a finger seal in place of the mitered seal interface illustrated in FIG. 2A as a means of transitioning between seal direction/ orientation. For example, when the configuration or exterior perimeter of the components 76 and 78 change direction. The arc-shaped segment 104, like the first seal assembly 72 and second seal assembly 74, will include two or more layers of thin sheet metal such as a first seal assembly layer 96 and a second seal assembly layer 98 that are nested to form a portion of the arc-shaped segment 104 and each layer (e.g., first seal assembly layer 96 and a second seal assembly layer 98) has thin slots or a plurality of slots 100 that extend from an end of the assembly layer and terminates in a keyhole geometry 102. In one non-limiting embodiment, the first finger seal assembly 72 and the second finger seal assembly 74 each have a linear configuration while the arc-shaped segment 104 has an arc or curved configuration.

Here arc sections are used in each layer of the finger seal and transition to a linear or other seal contours at tangency joint lines 106 shown in FIG. 4A. As such, the seal assembly 70 will include at least a first seal assembly 72 and second seal assembly 74 each being secured to opposite ends of the arc-shaped segment 104 at the tangency joint lines 106 shown in FIG. 4A.

While only one detail is illustrated in FIG. 4A, it is understood that multiple arc-shaped segments 104 are contemplated for use with several first seal assemblies 72 and second seal assemblies 74 in order to provide a seal between components 76 and 78.

Figure 6:
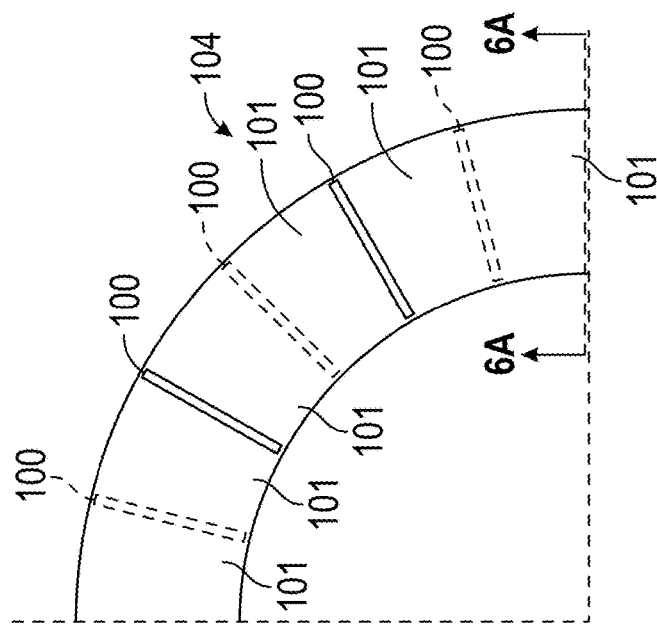
FIG. 6 illustrates a portion of a seal or finger seal assembly in accordance with an embodiment of the present disclosure.
Figure 6A:
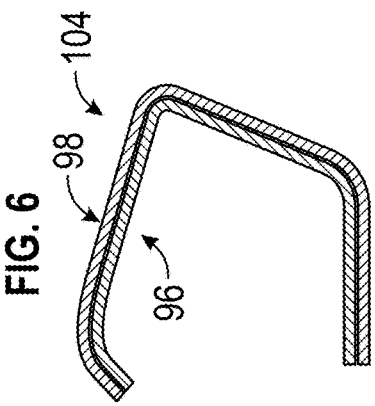
FIG. 6A is a cross-sectional view of a portion of the seal or finger seal assembly illustrated in FIG. 6.
Figure 5:
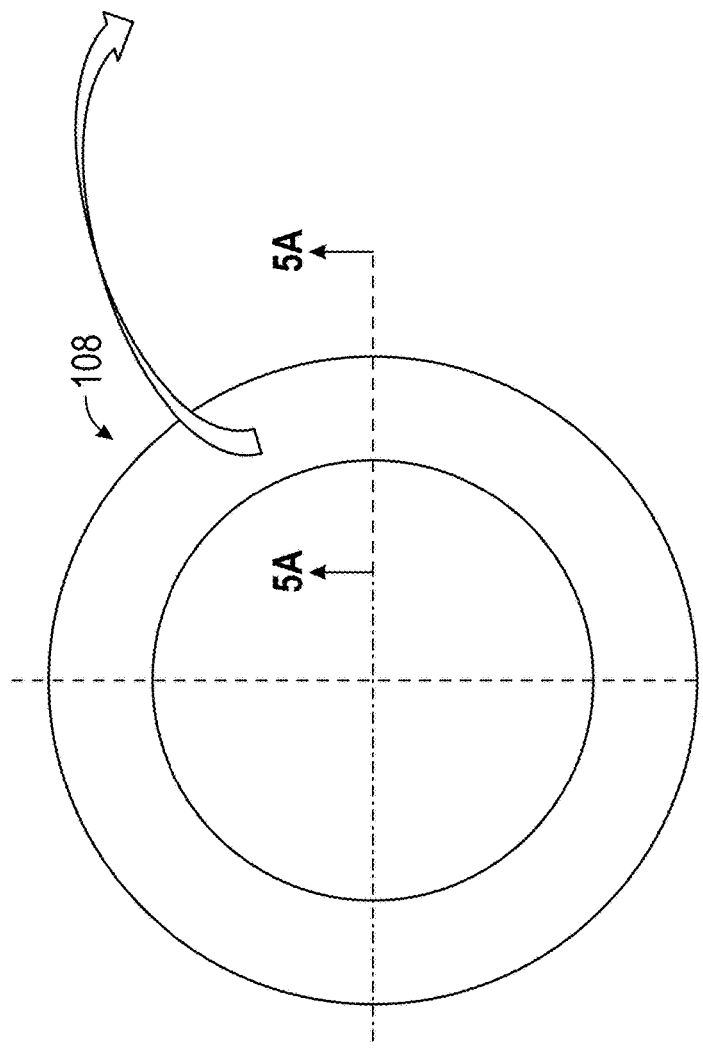
FIG. 5 illustrates an annular pre-form of a layer of a seal or finger seal assembly illustrated in accordance with an embodiment of the present disclosure.
Figure 5A:
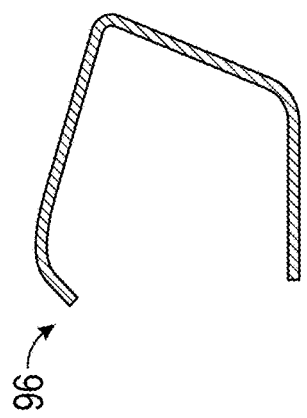
FIG. 5A is a cross-sectional view of a portion of the annular pre-form layer illustrated in FIG. 5.

As illustrated in FIGS. 5, 5A, 6 and 6A, each layer (e.g., first seal assembly layer 96 and a second seal assembly layer 98) of the arc section 104 can be extracted from a complete body of revolution 108 containing the desired cross-sectional shape via a die in hot or cold forming operation prior to cutting the first seal assembly layer 96 and the second seal assembly layer 98 to form slots 100 and keyhole ends 102. For example, the first seal assembly layer 96 and the second seal assembly layer 98 of the arc section 104 may be formed by roll bending and then nested together. As illustrated in FIG. 6, a 90 degree section of the pre-formed layers is used to form the arc section 104. Alternate methods of forming a partial (<360 degree) angle are also possible including rolling.

Figure 8A:
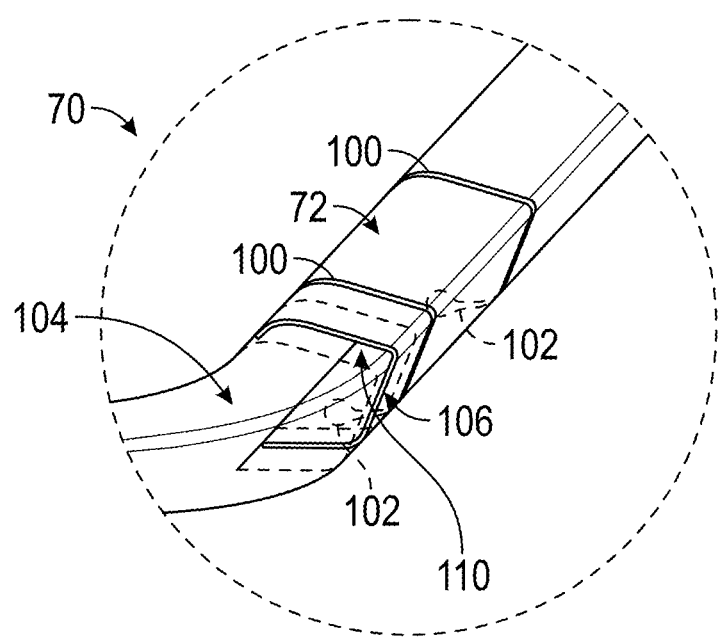

As shown in FIGS. 7, 8 and 8A, linear finger seal sections (e.g., a first finger seal assembly 72 and second finger seal assembly 74) interface with arc sections 104 at tangency joint lines or seams 106. The interface at this tangency joint line consists of overlapping joining strips 110 that tie the elements of each corresponding seal layers together at a seam while preventing joint leakage. For example and in order to secure the various assemblies together one section of each assembly will be longer than the other (e.g., first finger seal assembly layer 96 and second finger seal assembly layer 98) and the seal assembly it is attached to will have an opposite section that is longer than the other (e.g., first finger seal assembly layer 96 and second finger seal assembly layer 98) so that an overlapping interface or seam is provided. Note and as illustrated, FIG. 8 depicts the arc section 104 as a linear or non-arc seal. This is for convenience only and the actual arc section 104 includes segmented layers as depicted in FIGS. 6 and 7.

As the arc section or arc-shaped segment finger seal assembly 104 is joined to the linear sections (e.g., first finger seal assembly 72 and second finger seal assembly 74) the overlapping sections (e.g., first finger seal assembly layer 96 and second finger seal assembly layer 98) are secured to each other by welds (e.g., resistance stop welds or seam welds) at a seam. In addition, joining strips 110 are brazed or resistance welded at the interface between the arc section 104 and the linear sections (e.g., first finger seal assembly 72 and second finger seal assembly 74) at the seam. The joining strips 110 will be wide enough to cover the seams between the adjoining finger seal assemblies.

Figure 9:
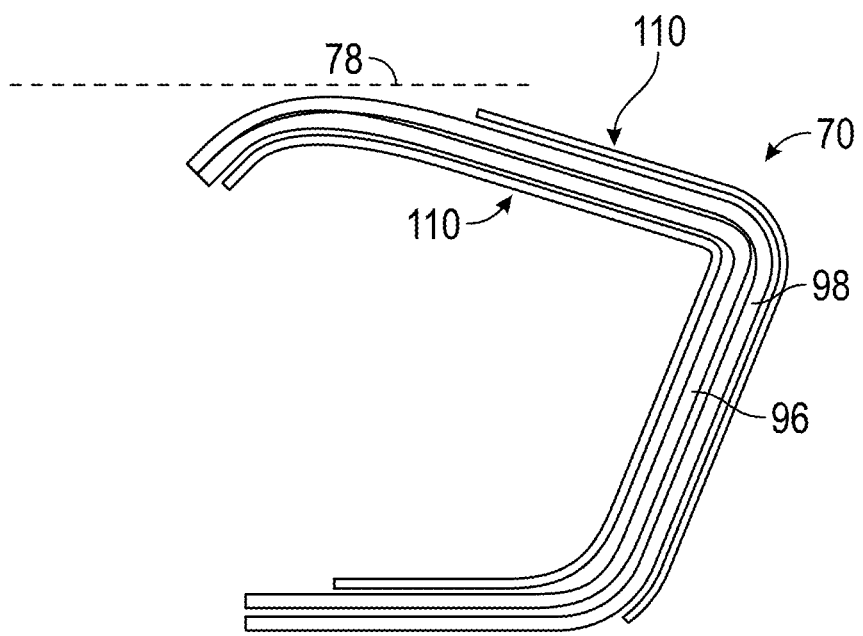
FIG. 9 is a cross sectional view illustrating the securement of linear finger seal sections with arc sections at tangency joint lines of a seal or finger seal assembly in accordance with an embodiment of the present disclosure.

For example and as illustrated in FIG. 9, the joining strips 110 are welded to the first finger seal assembly layer 96 and the second finger seal assembly layer 98 of the first finger seal assembly 72 and the second finger seal assembly 74 and the arc section 104. As illustrated and in one non-limiting embodiment, there are two joining strips 110 one located on the inside assembly layers and one located on the outside assembly layers at the interface between the first finger seal assembly 72 and second finger seal assembly 74 and the arc section 104.

Also illustrated in FIG. 9, the joining strip 110 located on the outer layer stops short of the sealing surface or interface 95 between the seal assemblies 72, 74 and 104 and the component 78 or alternatively component 76 to provide a smooth and better sealing effectiveness surface. In other words, the joining strips 110 interacting with second layer 98 do not follow the entire contour of 98. This ensures that the joining strip 110 will not contact the desired sealing surface on the adjacent part in a manner that would increase local leakage.

The joining strips 110 may be made of a similar material as the finger seal materials or alternate materials and may be secured via brazing, resistance weld or other means. If necessary, leakage at joint locations could be further reduced using a high temperature silicone sealant such as a RTV silicone sealant or other sealants.

In one non-limiting embodiment, the materials of seal assemblies and/or the joining strips 110 may be formed from a corrosion-resistant nickel chromium material such INCONEL 625, INCONEL 718, Haynes 230, Waspaloy, or other Nickel alloys or a cobalt-nickel-chromium-tungsten alloy such as HAYNES 188.

FIGS. 9 and 8A depicts the orientation and positioning of the joining strips relative to inner and outer layers of the finger seal. Note orientation of joining strips away from desired finder seal contact zone.

The proposed finger seal design concept and method of making allows for transition between different linear (or other shape) sections without the use of a mitered interface joint between individual finger seal assemblies and associated gap and leakage. Layered sections within arc region of the seal allows flexure of individual sealing layers while maintaining sealing effectiveness over a range of operating conditions and part to part geometric tolerances.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A seal assembly for a gas turbine engine, comprising:
   a first finger seal assembly, the first finger seal assembly including two layers each being secured to each other, the two layers each having a plurality of slots that are offset from each other when the two layers of the first finger seal assembly are secured to each other;
   a second finger seal assembly, the second finger seal assembly including two layers each secured to each other, the two layers each having a plurality of slots that are offset from each other when the two layers of the second finger seal assembly are secured to each other; and
   an arc-shaped segment finger seal assembly located between the first finger seal assembly and the second finger seal assembly, the arc-shaped finger seal assembly including two layers each secured to each other, the two layers each having a plurality of slots that are offset from each other when the two layers of the arc-shaped finger seal assembly are secured to each other, wherein the arc-shaped segment finger seal assembly facilitates transitioning between orientation of the first finger seal assembly and the second finger seal assembly.

2. The seal assembly according to claim 1, wherein the first finger seal assembly and the second finger seal assembly are welded to the arc-shaped segment finger seal assembly.

3. The seal assembly according to claim 1, wherein the first finger seal assembly and the second finger seal assembly have a linear configuration.

4. The seal assembly according to claim 1, further comprising a first joining strip that overlaps a seam where the first finger seal assembly is secured to the arc-shaped segment finger seal assembly and a second joining strip that overlaps a seam where the second finger seal assembly is secured to the arc-shaped segment finger seal assembly.

5. The seal assembly according to claim 4, wherein the first joining strip and the second joining strip are formed of the same material as the first finger seal assembly, the arc-shaped segment finger seal assembly and the second finger seal assembly.

6. The seal assembly according to claim 1, further comprising a first pair of joining strips that overlap opposite sides of a seam where the first finger seal assembly is secured to the arc-shaped segment finger seal assembly and a second pair of joining strips that overlap opposite sides of a seam where the second finger seal assembly is secured to the arc-shaped segment finger seal assembly.

7. The seal assembly according to claim 6, wherein the first pair of joining strips and the second pair of joining strips are formed of the same material as the first finger seal assembly, the arc-shaped segment finger seal assembly and the second finger seal assembly.

8. The seal assembly according to claim 1, wherein the first finger seal assembly, the arc-shaped segment finger seal assembly and the second finger seal assembly are formed from the same material.

9. The seal assembly according to claim 1, wherein the first finger seal assembly, the arc-shaped segment finger seal assembly and the second finger seal assembly are formed from a corrosion-resistant nickel chromium material.

10. The seal assembly according to claim 1, wherein the plurality of slots extend from a keyhole geometry.

11. An assembly of a gas turbine engine, comprising:
a first component;
a second component;
a seal assembly located between the first component and the second component, the seal assembly comprising:
a first finger seal assembly, the first finger seal assembly including two layers secured to each other, the two layers each having a plurality of slots that are offset from each other when the two layers of the first finger seal assembly are secured to each other;
a second finger seal assembly, the second finger seal assembly including two layers secured to each other, the two layers each having a plurality of slots that are offset from each other when the two layers of the second finger seal assembly are secured to each other; and
an arc-shaped segment finger seal assembly located between the first finger seal assembly and the second finger seal assembly, the arc-shaped finger seal assembly including two layers secured to each other, the two layers each having a plurality of slots that are offset from each other when the two layers of the arc-shaped finger seal assembly are secured to each other, wherein the arc-shaped segment finger seal assembly facilitates transitioning between orientation of the first finger seal assembly and the second finger seal assembly.

12. The assembly according to claim 11, wherein the first finger seal assembly and the second finger seal assembly are welded to the arc-shaped segment finger seal assembly.

13. The assembly according to claim 11, wherein the first finger seal assembly and the second finger seal assembly have a linear configuration.

14. The assembly according to claim 11, further comprising a first joining strip that overlaps a seam where the first finger seal assembly is secured to the arc-shaped segment finger seal assembly and a second joining strip that overlaps a seam where the second finger seal assembly is secured to the arc-shaped segment finger seal assembly.

15. The assembly according to claim 14, wherein the first joining strip and the second joining strip are formed of the same material as the first finger seal assembly, the arc-shaped segment finger seal assembly and the second finger seal assembly.

16. The assembly according to claim 11, further comprising a first pair of joining strips that overlap opposite sides of a seam where the first finger seal assembly is secured to the arc-shaped segment finger seal assembly and a second pair of joining strips that overlap opposite sides of a seam where the second finger seal assembly is secured to the arc-shaped segment finger seal assembly.

17. The assembly according to claim 16, wherein the first pair of joining strips and the second pair of joining strips are formed of the same material as the first finger seal assembly, the arc-shaped segment finger seal assembly and the second finger seal assembly.

18. The assembly according to claim 11, wherein the first finger seal assembly, the arc-shaped segment finger seal assembly and the second finger seal assembly are formed from the same material.

19. A method of forming a seal assembly for a gas turbine engine, comprising:
forming a first finger seal assembly by securing two layers to each other, the two layers each having a plurality of slots that are offset from each other when the two layers of the first finger seal assembly are secured to each other;
forming a second finger seal assembly by securing two layers to each other, the two layers each having a plurality of slots that are offset from each other when the two layers of the second finger seal assembly are secured to each other; and
securing an arc-shaped segment finger seal assembly between the first finger seal assembly and the second finger seal assembly, the arc-shaped finger seal assembly including two layers secured to each other, the two layers each having a plurality of slots that are offset from each other when the two layers of the arc-shaped finger seal assembly are secured to each other, wherein the arc-shaped segment finger seal assembly facilitates transitioning between orientation of the first finger seal assembly and the second finger seal assembly.

20. The method as in claim 19, further comprising welding the first finger seal assembly and the second finger seal assembly are to the arc-shaped segment finger seal assembly.

\* \* \* \* \*